United States Patent
Kawasaki et al.

(10) Patent No.: US 7,272,648 B2
(45) Date of Patent: Sep. 18, 2007

(54) NETWORK MONITORING DEVICE AND METHOD

(75) Inventors: Atsushi Kawasaki, Kawasaki (JP); Toru Shimadoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 10/099,326

(22) Filed: Mar. 14, 2002

(65) Prior Publication Data

US 2003/0061345 A1   Mar. 27, 2003

(30) Foreign Application Priority Data

Sep. 27, 2001   (JP)   ............................. 2001-295269

(51) Int. Cl.
*G06F 15/173* (2006.01)

(52) U.S. Cl. ........................ 709/224; 709/223; 714/47; 714/48

(58) Field of Classification Search ........ 709/223–224, 709/200; 714/43, 47–48
See application file for complete search history.

(56) References Cited

U.S. PATENT DOCUMENTS

| | | | |
|---|---|---|---|
| 5,375,070 A | | 12/1994 | Hershey et al. |
| 5,574,860 A | * | 11/1996 | Perlman et al. ............. 709/220 |
| 5,598,532 A | * | 1/1997 | Liron ............................ 703/2 |
| 5,710,885 A | * | 1/1998 | Bondi ......................... 709/224 |
| 5,768,522 A | * | 6/1998 | Nicolas ....................... 709/224 |
| 5,875,306 A | * | 2/1999 | Bereiter ....................... 709/220 |
| 6,101,538 A | | 8/2000 | Brown |
| 6,377,987 B1 | * | 4/2002 | Kracht ........................ 709/220 |
| 6,581,104 B1 | * | 6/2003 | Bereiter ...................... 709/232 |
| 6,633,230 B2 | * | 10/2003 | Grandin et al. .............. 340/506 |
| 6,691,161 B1 | * | 2/2004 | Cook et al. .................. 709/223 |
| 6,691,256 B1 | * | 2/2004 | Cook et al. .................... 714/43 |
| 6,832,247 B1 | * | 12/2004 | Cochran et al. ............. 709/223 |
| 6,900,822 B2 | * | 5/2005 | Germain et al. ............. 715/736 |
| 2002/0161877 A1 | * | 10/2002 | Stevenson et al. .......... 709/223 |

FOREIGN PATENT DOCUMENTS

| | | |
|---|---|---|
| JP | 4-142840 | 5/1992 |
| JP | 7-143177 | 6/1995 |
| JP | 07-312594 | 11/1995 |
| JP | 9-214502 | 8/1997 |
| JP | 10-4407 | 1/1998 |
| JP | 11-313108 | 11/1999 |

* cited by examiner

*Primary Examiner*—Glenton B. Burgess
*Assistant Examiner*—LaShanya R. Nash
(74) *Attorney, Agent, or Firm*—Katten Muchin Rosenman LLP

(57) ABSTRACT

Network monitoring device and method whereby the user can be given an alarm before a guaranteed limit of packet routing is exceeded. Counting section counts the number of nodes based on packets exchanged between the nodes, and comparing section compares the node count with an allowable value. If the node count is larger than the allowable value, alarm output section outputs a message that the node count is excessively large.

5 Claims, 17 Drawing Sheets

OSI LEVEL-1 ROUTING TABLE 121a

| System ID | Next-Hop | SNPA | Interface | Metric | State |
|---|---|---|---|---|---|
| aaaa.aaaa.aaaa | aaaa.aaaa.aaaa | aaaa.aaaa.aaaa | Et0 | 1 | Up |
| bbbb.bbbb.bbbb | 0000.0000.0000 | - - | | 0 | Up |
| ... | ... | ... | ... | ... | ... |

FIG. 4(A)

OSI LEVEL-2 ROUTING TABLE 121b

| Area Address | System ID | Protocol | State | Interface |
|---|---|---|---|---|
| 39840f800000000000xxxxxx | aaaa.aaaa.aaaa | IS-IS | Up | Eth0 |
| 39840f800000000000yyyyyy | bbbb.bbbb.bbbb | IS-IS | Up | |
| ... | ... | ... | ... | ... |

FIG. 4(B)

OSI NODE COUNT TABLE 122a

| Total | ADJNUM | CKTID | SYSID |
|---|---|---|---|
| m1 | 1 | 1 | aaaa.aaaa.aaaa |
|  | 1 | 2 | bbbb.bbbb.bbbb |
|  | 1 | 3 | cccc.cccc.cccc |
|  | ⋮ | ⋮ | ⋮ |

FIG. 5(A)

OSI AREA COUNT TABLE 122b

| Total | ADJNUM | CKTID | Area Address |
|---|---|---|---|
| n1 | 1 | 1 | 39840f800000000000xxxxxxxx |
|  | 1 | 2 | 39840f800000000000yyyyyyyy |
|  | 1 | 3 | 39840f800000000000zzzzzzzz |
|  | ⋮ | ⋮ | ⋮ |

FIG. 5(B)

ARP TABLE 121c

| Internet Address | Physical Address | Type |
|---|---|---|
| xxx.xxx.xxx.xxx | xx-xx-xx-xx-xx-xx | dynamic |
| yyy.yyy.yyy.yyy | yy-yy-yy-yy-yy-yy | dynamic |
| ... | ... | ... |

FIG. 6(A)

IP ROUTING TABLE 121d

| Destination | Network mask | Gateway | Flags | Metric | Interface |
|---|---|---|---|---|---|
| 127.0.0.0 | 255.0.0.0 | 127.0.0.1 | UH | 0 | lo0 |
| xxx.xxx.xxx.xxx | 255.255.255.255 | xxx.xxx.xxx.xxx | UG | 1 | |
| yyy.yyy.yyy.yyy | 255.255.0.0 | yyy.yyy.yyy.yyy | UG | 1 | |
| ... | ... | ... | ... | ... | ... |

FIG. 6(B)

TCP/IP NODE COUNT TABLE 122c

| Total | ADJNUM | CKTID | Physical Address |
|---|---|---|---|
| m2 | 1 | 1 | xx-xx-xx-xx-xx-xx |
| ✕ | 1 | 2 | yy-yy-yy-yy-yy-yy |
|  | 1 | 3 | zz-zz-zz-zz-zz-zz |
|  | ⋮ | ⋮ | ⋮ |

FIG. 7(A)

TCP/IP AREA COUNT TABLE 122d

| Total | ADJNUM | CKTID | IP Address |
|---|---|---|---|
| n2 | 1 | 1 | xx-xx-xx-xx-xx-xx |
| ✕ | 1 | 2 | yy-yy-yy-yy-yy-yy |
|  | 1 | 3 | zz-zz-zz-zz-zz-zz |
|  | ⋮ | ⋮ | ⋮ |

FIG. 7(B)

| Total | SYSID | AREAADDR/IP address | Gateway | User | Level | Password | State | Interface |
|---|---|---|---|---|---|---|---|---|
| m3 | aaaa.aaaa.aaaa | 39840f800000000000xxxxxxxx | -- | User1 | 1 | **** | Up | Eth0 |
| ☒ | xxx.xxx.xxx.xxx | yyy.yyy.yyy.yyy | yyy.yyy.yyy.zzz | User2 | 2 | **** | Up | Eth0 |
| | ... | ... | ... | ... | ... | ... | ... | ... |

NETWORK MONITORING DEVICE AND METHOD

BACKGROUND OF THE INVENTION

1. Field of the Invention

The present invention relates to network monitoring device and method, and more particularly, to network monitoring device and method for monitoring load on a network.

2. Description of the Related Art

To an OSI (Open Systems Interconnection)-based or TCP/IP (Transmission Control Protocol/Internet Protocol)-based network are connected various network devices such as a SONET (Synchronous Optical Network) or SDH (Synchronous Digital Hierarchy) transmission device, an ATM (Asynchronous Transfer Mode) exchange, a router and terminal units. Such network devices connected to the network are called nodes.

FIG. 17 shows an example of a conventional network configuration. In FIG. 17, an OSI network is illustrated by way of example. The OSI network comprises a plurality of areas 910, 920 and 930. The area 910 includes nodes 911 and 912. The area 920 includes nodes 921 to 923, and the area 930 includes nodes 931 and 932.

In the OSI network, each of the nodes 911, 912, 921 to 923, 931 and 932 transmits and receives Link State PDU (Protocol Data Unit) (hereinafter referred to as LSP) to and from another node in the same or other areas 910, 920 and 930 (level-1 LSP for intra-area transmission and level-2 LSP for inter-area transmission) by means of Network Layer CLNP (Connection Less Network Protocol). The LSP includes routing information, which is information indicating routes which are to be followed for appropriate transfer of packets. As the LSP is transmitted and received, the routing information is dynamically exchanged between the nodes 911, 912, 921 to 923, 931 and 932.

In the TCP/IP network, on the other hand, using IP (Internet Protocol) or ARP (Address Resolution Protocol), individual nodes exchange a Hello PDU or ARP packet with each other. The Hello PDU and ARP packet include routing information, whereby the routing information is dynamically exchanged also in the TCP/IP network.

The routing information exchanged in the OSI or TCP/IP network is loaded, as a routing table, into the memory of a node (router) that takes care of routing. In the routing table are registered, with respect to each destination node, an identifier of a communication interface for communicating with the destination node, an identifier (e.g., address) of a router (or gateway) which relays packets addressed to the destination node, etc. Thus, the routing table is stored in routers, so that each router can identify a destination to which a received packet is to be transferred. As a consequence, packets on the network can be passed on and transferred to correct destination nodes by the routers.

Meanwhile, a network has its own limit on the number of nodes up to which packets can be correctly routed.

For example, the router is unable to store a routing table that exceeds the capacity of the built-in memory thereof. Thus, the router has its own limit on the number of destination nodes which the router can identify, and therefore, cannot correctly transfer packets to all of nodes exceeding the limit. The number of identifiable nodes differs from router to router.

If there exists even a single router which can identify fewer nodes than the number of nodes connected to the network, then inter-node communications of the network cannot be guaranteed. When configuring a network, therefore, the total number of nodes needs to be restricted to such an extent that a router with the smallest number of identifiable nodes can correctly perform routing.

Also, since the routing information is exchanged between nodes at regular intervals, increase in the number of nodes connected to the network inevitably entails an increase of communication traffic of the transmission path. If the communication traffic exceeds the transmission capacity of the transmission path, appropriate transmission and reception of packets cannot be guaranteed. Accordingly, the number of nodes which communicate via each transmission path needs to be restricted to a number falling within an allowable range of the capacity of the transmission path.

Thus, when configuring or reconfiguring a network, the user must carry on the work with a good understanding of the number of nodes up to which packet routing can be guaranteed.

In the case of a large-scale network, however, it is difficult to correctly determine the number of nodes up to which packet routing can be guaranteed, by investigating all network environments. For example, when the network is to be extended, the routing tables of all routers on the network may be looked up to determine whether the number of nodes exceeds the limit or not, but such work is extremely complicated and consumes much labor and time.

In cases where one node is added to a network, the network environment around the node to be added may simply be examined. However, where there arises a need for a substantial change of the network configuration or the number of nodes, for example, where independently operated networks are connected together, all network environments need to be examined, requiring considerable time and labor.

SUMMARY OF THE INVENTION

The present invention was created in view of the above circumstances, and an object thereof is to provide network monitoring device and method capable of giving an alarm to the user before a guaranteed limit of packet routing is exceeded.

To achieve the object, there is provided a network monitoring device for monitoring load on a network. The network monitoring device comprises counting means for counting a total number of nodes operated on the network, based on packets exchanged between the nodes via the network, comparing means for comparing the node count counted by the counting means with a preset allowable value, and alarm output means for outputting a message that the node count is excessively large, if it is judged by the comparing means that the node count has exceeded the allowable value.

Also, to achieve the above object, there is provided a network monitoring device for monitoring load on a network. The network monitoring device comprises counting means for counting the number of areas to which nodes operated on the network belong, based on packets exchanged between the nodes via the network, comparing means for comparing the area count counted by the counting means with a preset allowable value, and alarm output means for outputting a message that the area count is excessively large, if it is judged by the comparing means that the area count has exceeded the allowable value.

Further, to achieve the above object, there is provided a network monitoring method for monitoring load on a network. The network monitoring method comprises the steps of: counting a total number of nodes operated on the network, based on packets exchanged between the nodes via the network; comparing the obtained node count with a preset allowable value; and outputting a message that the node count is excessively large, if it is judged that the node count has exceeded the allowable value.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4(A) and 4(B) are charts showing examples of OSI routing table, wherein FIG. 4(A) shows an example of an OSI level-1 routing table, and FIG. 4(B) shows an example of an OSI level-2 routing table;

FIGS. 5(A) and 5(B) are charts illustrating OSI routing load information, wherein FIG. 5(A) shows an OSI node count table, and FIG. 5(B) shows an OSI area count table;

FIGS. 6(A) and 6(B) are charts showing examples TCP/IP routing table, wherein FIG. 6(A) shows an example of an ARP table, and FIG. 6(B) shows an example of an IP routing table;

FIGS. 7(A) and 7(B) are charts illustrating TCP/IP routing load information, wherein FIG. 7(A) shows a TCP/IP node count table, and FIG. 7(B) shows a TCP/IP area count table;

FIG. 16 is a chart showing an example of a login table; and

DESCRIPTION OF THE PREFERRED EMBODIMENTS

Embodiments of the present invention will be hereinafter described with reference to the drawings.

The principle of the present invention applied to principal embodiments thereof will be explained prior to the detailed description of embodiments.

Figure 1:
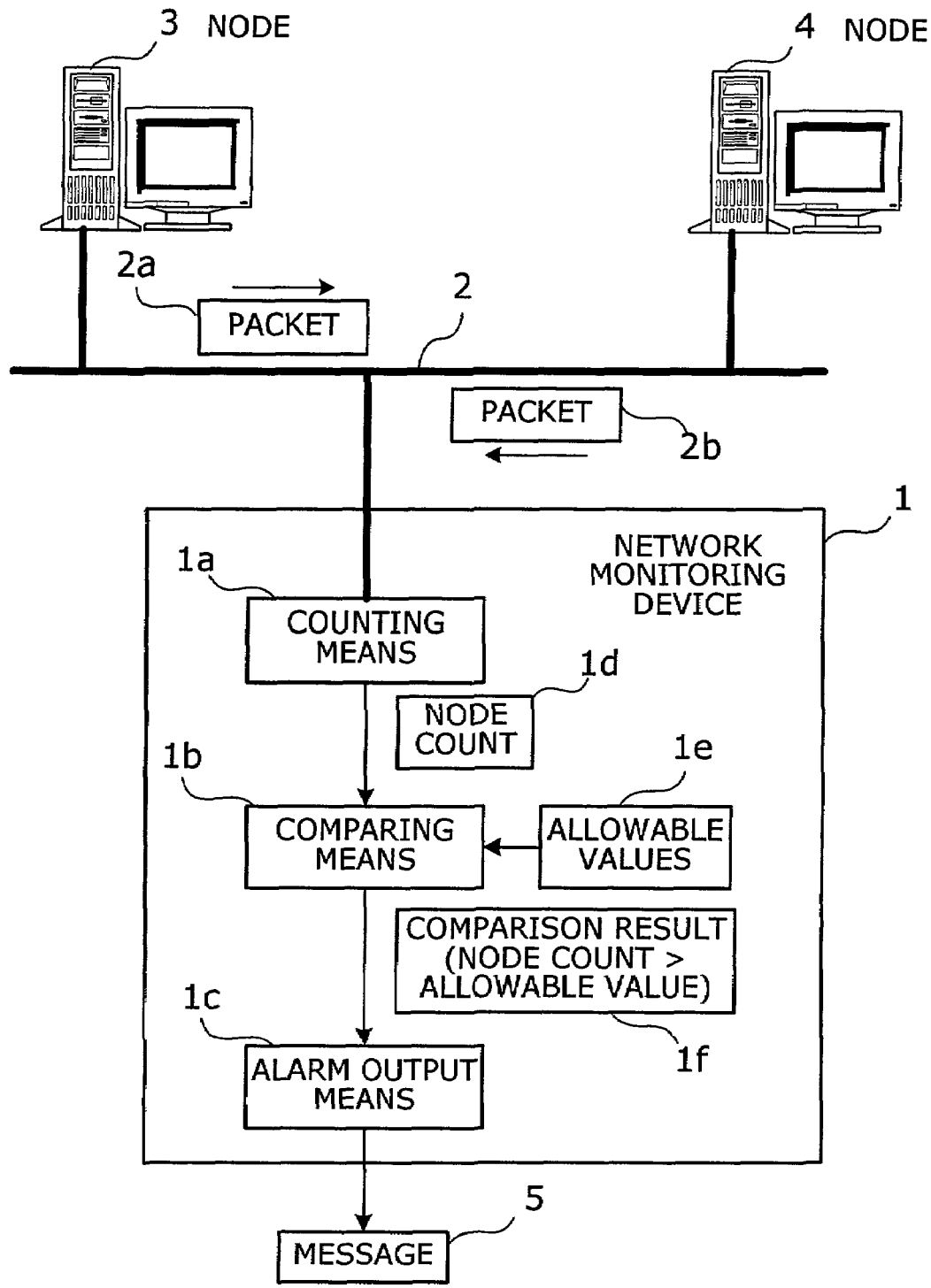
FIG. 1 is a diagram illustrating a configuration according to the principle of the present invention.

FIG. 1 illustrates a configuration according to the principle of the present invention. A network monitoring device 1 according to the present invention monitors the load on a network 2. To the network 2 are connected the network monitoring device 1 and other nodes 3 and 4. The network monitoring device 1 also constitutes a node on the network 2.

The network monitoring device 1 includes counting means 1a, comparing means 1b, and alarm output means 1c.

The counting means 1a counts the number 1d of nodes operated on the network 2, based on packets 2a and 2b exchanged between the network monitoring device 1 and the node 3 or 4 and between the nodes 3 and 4 via the network 2. The packets 2a and 2b are each an LSP in the case where the network is an OSI network, or a Hello PDU or ARP packet in the case where the network is a TCP/IP network. Each of the packets includes routing information whereby the nodes operated on the network 2 can be identified. The nodes operated on the network 2 denote those nodes which are connected to the network 2 and which are in a state capable of communicating through the network 2.

The comparing means 1b compares the node count 1d counted by the counting means 1a with an allowable value 1e set in advance. The result 1f of comparison is supplied to the alarm output means 1c. On receiving the comparison result 1f, the alarm output means 1c analyzes the contents thereof. If it is concluded that the node count 1d has exceeded the allowable value 1e, the alarm output means 1c outputs a message 5 that the node count 1d is excessively large. A similar message may be output also when the node count 1d is equal to the allowable value 1e.

With the network monitoring device 1 described above, the counting means 1a counts the number 1d of nodes based on the packets 2a and 2b exchanged between the nodes 3 and 4, whereupon the comparing means 1b compares the node count 1d with the allowable value 1e. If the node count 1d is greater than the allowable value 1e, the alarm output means 1c outputs the message 5 that the node count 1d is excessively large.

This makes it possible to monitor the number 1d of nodes on the network 2 and, when the node count 1d has exceeded the allowable value 1e, to notify the user by the message 5 that the node count 1d has exceeded the allowable value 1e.

As the allowable value 1e, the number of nodes corresponding to a guaranteed limit of routing on the network 2 may be set beforehand, whereby the message 5 is output when the node count 1d has exceeded the number of nodes equivalent to the guaranteed limit of routing. In other words, while the network monitoring device 1 is operating without outputting the message 5, the node count 1d remains below the guaranteed limit of routing.

Accordingly, in the case where the configuration of the network 2 has been altered, the user has only to confirm whether the message 5 is output or not, and need not look into each router to compare the number 1d of identifiable nodes with the number of registered destination nodes. As a consequence, the user is relieved of the work load associated with reconfiguration of the network, and also the network operation reliability improves.

Instead of the number 1d of nodes, the number of areas on the network 2 may be counted. In this case, an allowable value for the area count is set in place of the allowable value 1e for the node count 1d. Also when the number of areas is excessively large, the network reliability is impaired. Thus, the area count is monitored, and when the area count has exceeded the allowable value, a message is output, thereby enhancing the network reliability.

Also, the alarm message 5 may be output in multiple phases. For example, a precautionary value smaller than the allowable value 1e is set beforehand, in addition to the allowable value 1e. The comparing means 1b compares the node count 1d with the precautionary value, and if the node count 1d has exceeded the precautionary value, a cautioning message (warning) that the node count 1d is approaching the allowable value 1e is output.

The network monitoring device 1 of the present invention can be incorporated into various network devices (nodes) connected to the network 2. Especially where the network monitoring device is incorporated into a router, the load on the network 2 can be efficiently monitored.

Specifically, a router exchanges routing information with other nodes and creates a routing table for routing purposes. Using the routing table, the number 1d of nodes operated on the network 2 may be counted, whereby an increase of the processing load on the node due to the incorporation of the network monitoring device 1 therein as well as an increase of the traffic of the network 2 can be minimized. Thus, in the following description of first to fourth embodiments, routers having the function of the network monitoring device 1 incorporated therein will be explained by way of example.

Also in cases where the network monitoring device 1 is incorporated into a node other than the router, increase of the traffic of the network 2 should desirably be minimized. Accordingly, as a fifth embodiment of the invention, a monitoring control device which counts the number 1d of operated nodes without exchanging the routing information will be explained by way of example.

FIRST EMBODIMENT

In the first embodiment, the function of the network monitoring device 1 is incorporated into a node having a router function.

Figure 2:
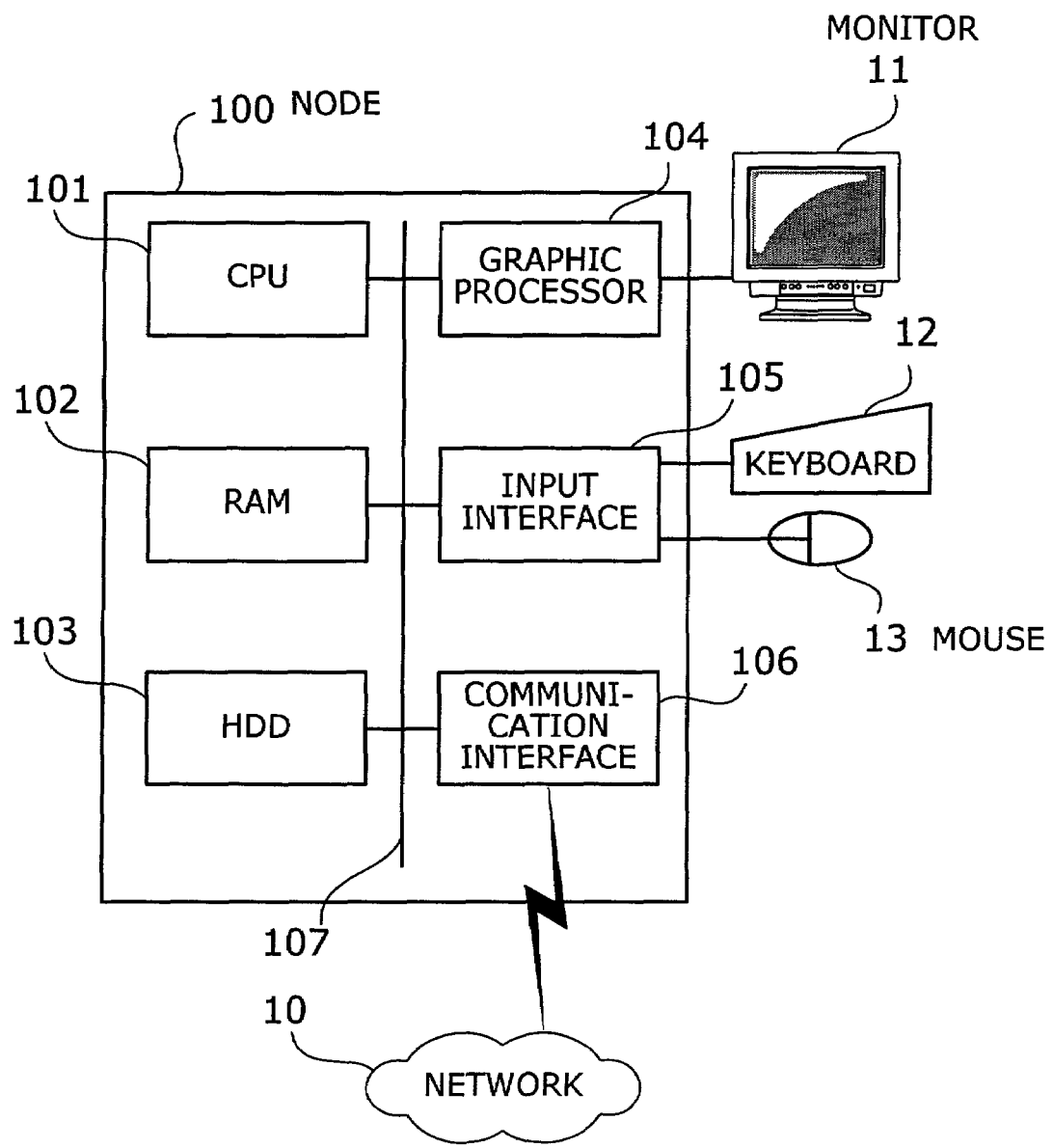
FIG. 2 is a diagram showing an example of a hardware configuration of a node used in a first embodiment.

FIG. 2 shows an example of a hardware configuration of a node used in the first embodiment. The node 100 includes a CPU (Central Processing Unit) 101 whereby the entire node is controlled. To the CPU 101 are connected, via a bus 107, a RAM (Random Access Memory) 102, a hard disk drive (HDD) 103, a graphic processor 104, an input interface 105, and a communication interface 106.

The RAM 102 temporarily stores at least part of OS (Operating System) programs and application programs executed by the CPU 101. Also, the RAM 102 stores various data necessary for the processing by the CPU 101. The HDD 103 stores the OS and application programs.

The graphic processor 104 is connected with a monitor 11. In accordance with instructions from the CPU 101, the graphic processor 104 causes the monitor 11 to display an image on a screen thereof. The input interface 105 is connected with a keyboard 12 and a mouse 13. The input interface 105 sends signals from the keyboard 12 and the mouse 13 to the CPU 101 via the bus 107.

The communication interface 106 is connected to a network 10. The communication interface 106 transmits and receives data to and from other nodes through the network 10.

With the hardware configuration described above, the processing function of the first embodiment is fulfilled.

Figure 3:
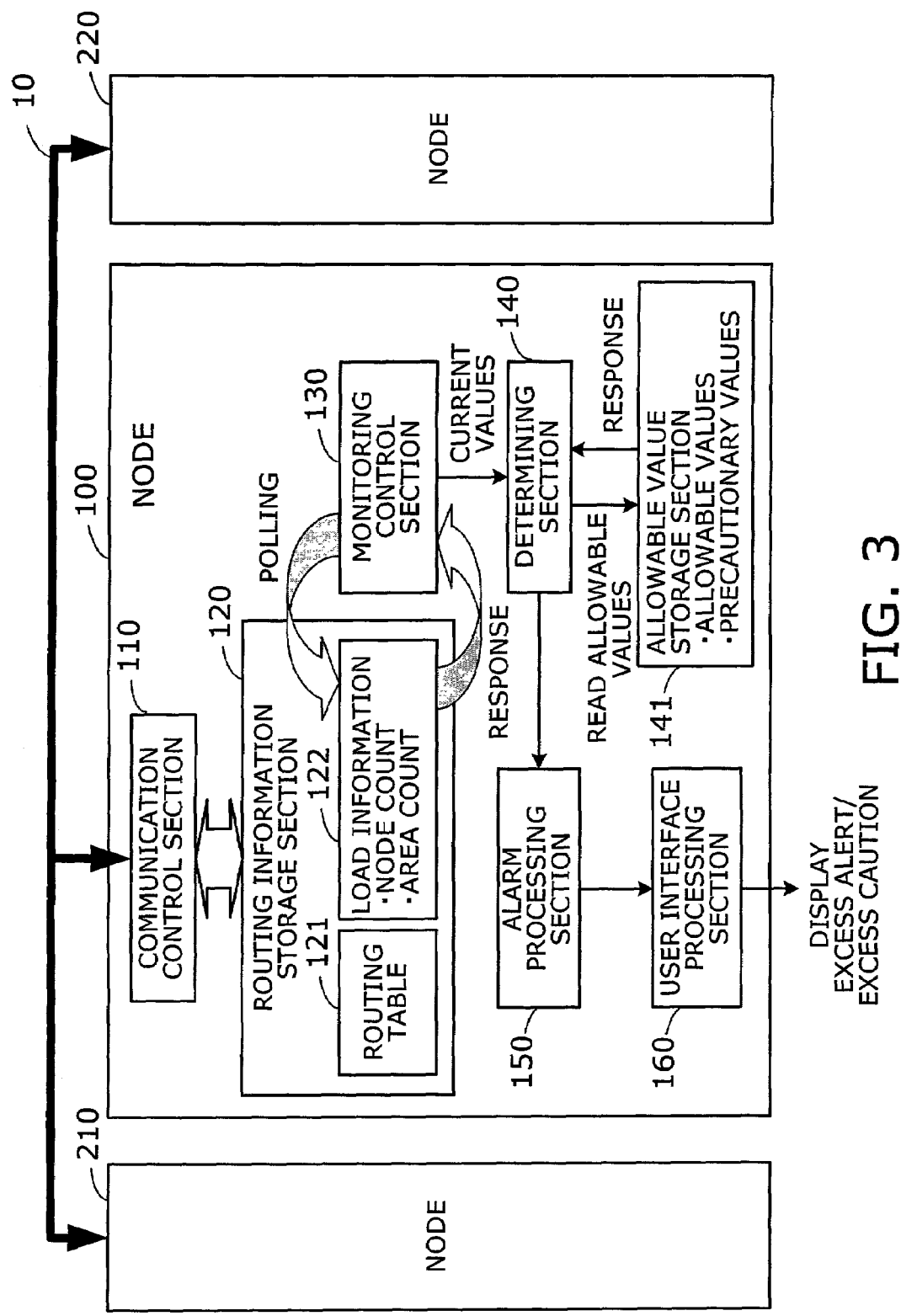
FIG. 3 is a functional block diagram illustrating the function of the node according to the first embodiment.

FIG. 3 is a functional block diagram illustrating the function of the node according to the first embodiment. In the example shown in FIG. 3, the node 100 as well as other nodes 210 and 220 are connected to the network 10.

The node 100 includes a communication control section 110, a routing information storage section 120, a monitoring control section 130, a determining section 140, an allowable value storage section 141, an alarm processing section 150, and a user interface processing section 160.

The communication control section 110 takes care of communications via the network 10, and performs a routing function with the use of a routing table 121 as one of its communication functions. On acquiring new routing information one after another through the network 10, the communication control section 110 successively registers the acquired routing information in the routing table 121. The routing information includes, for example, the address of a destination node, the address of a node which relays a packet addressed to the destination node, etc. Also, when new routing information has been registered in the routing table 121, the communication control section 110 counts the number of destination nodes (node count) registered in the routing table and the number of areas (area count) to which the destination nodes belong. The communication control section 110 then stores the results of counting in the routing information storage section 120 as load information 122.

The routing information storage section 120 stores the routing table 121 and the load information 122. The routing table 121 is information of tabular form in which are defined, with respect to the destination nodes, routes (communication ports, relay nodes) to be followed. For example, in the case of OSI network, the destination address is defined by an NSAP (Network Service Access Point) address, and in the case of TCP/IP network, the destination address is defined by an IP address.

As the load information 122, the node count and the area count are registered. The node count represents a total number of nodes whose addresses are registered in the routing table 121 as destination addresses. The area count represents a total number of areas to which these nodes, the addresses of which are registered in the routing table 121 as destination addresses, belong. The node and area counts are dynamically varied by the communication control section 110.

The monitoring control section 130 performs polling at predetermined intervals of time and acquires, as a response to the polling, current values of the node and area counts of the load information 122. Then, the monitoring control section 130 transfers the acquired current values of the node and area counts to the determining section 140.

The determining section 140 performs a process for reading allowable values and precautionary values from the allowable value storage section 141 and, as a response thereto, receives allowable and precautionary values for the node count and allowable and precautionary values for the area count. The determining section 140 compares the current value of the node count with each of the allowable and precautionary values for the node count. Similarly, the determining section 140 compares the current value of the area count with each of the allowable and precautionary values for the area count. In accordance with the comparison results, a decision is made as to whether or not an alarm needs to be generated.

Specifically, the allowable and precautionary values for the node count and the allowable and precautionary values for the area count are previously stored in the allowable value storage section 141. The allowable value for the node count is set to a maximum number of nodes up to which the node 100 can perform routing with ease. Even if the node count exceeds the allowable value, it does not mean that the routing process instantly becomes faulty. As the precautionary value for the node count, a node count threshold for cautioning is defined as a rate (e.g., 80%) with respect to the allowable value. The allowable value for the area count is set to a maximum number of areas up to which the node 100 can perform routing with ease. Even if the area count exceeds the allowable value, it does not mean that the routing process immediately becomes faulty. As the precautionary value for the area count, an area count threshold for cautioning is defined as a rate (e.g., 80%) with respect to the allowable value.

The determining section 140 makes determinations as to the node count and the area count separately, and notifies the alarm processing section 150 of the determination results. The determination as to the node count provides one of three results, namely, the result that the node count is smaller than the precautionary value, the result that the node count is greater than or equal to the precautionary value and at the same time smaller than the allowable value, and the result that the node count is greater than or equal to the allowable value. Similarly, the determination as to the area count provides one of three results, namely, the result that the area count is smaller than the precautionary value, the result that the area count is greater than or equal to the precautionary value and at the same time smaller than the allowable value, and the result that the area count is greater than or equal to the allowable value.

In accordance with the determination results supplied from the determining section 140, the alarm processing section 150 generates an alarm message. The alarm message includes an excess alert and an excess caution (warning).

Specifically, the alarm processing section 150 generates no alarm if the node count is smaller than the precautionary value, generates an excess caution (warning) if the node count is greater than or equal to the precautionary value and at the same time smaller than the allowable value, and generates an excess alert if the node count is greater than or equal to the allowable value. Similarly, the alarm processing section 150 generates no alarm if the area count is smaller than the precautionary value, generates an excess caution if the area count is greater than or equal to the precautionary value and at the same time smaller than the allowable value, and generates an excess alert if the area count is greater than or equal to the allowable value.

The user interface processing section 160 causes the display device to display the alarm generated by the alarm processing section 150.

The contents of the routing table 121 and load information 122 vary depending on the communication protocol which takes care of routing. In the following, therefore, specific examples of the routing table 121 and load information 122 will be explained separately with reference to cases where the communication protocol is for OSI and TCP/IP, respectively.

In the case of OSI routing, a routing table for level-1 routing (intra-area routing) and a routing table for level-2 routing (inter-area routing) are used.

FIGS. 4(A) and 4(B) show the OSI routing tables by way of example, wherein FIG. 4(A) shows an example of the OSI level-1 routing table, and FIG. 4(B) shows an example of the OSI level-2 routing table.

The OSI level-1 routing table 121*a* has columns "System ID", "Next-Hop", "SNPA" (Subnetwork Point of Attachment), "Interface", "Metric" and "State". In each column is set information about connected destination nodes.

"System ID" indicates the MAC (Media Access Control) address of each destination node. The MAC address is a hardware address set in advance for each communication port. "Next-Hop" indicates the MAC address of a relay node via which a packet is transmitted to the node identified by "System ID". "SNPA" indicates the MAC address of a node which serves as a junction point between subnetworks (areas). "Interface" indicates the identifier of a communication interface (connection port) from which a packet is delivered to the node identified by "System ID". "Metric" indicates the number of routers (hop count) which relay a packet when the packet is transmitted to the node identified by "System ID". "State" indicates the state of connection of the node identified by "System ID". For example, if the destination node concerned is normally operating, "Up" is set in the corresponding field of the "State" column.

The OSI level-2 routing table 121*b* has columns "Area Address", "System ID", "Protocol", "State" and "Interface". In each column, information about connected areas is registered.

"Area Address" indicates the area address of an area to which a destination node belongs. "System ID" indicates the MAC address of a node which serves as a gateway for a packet transmitted to the corresponding area address. "Protocol" indicates a routing protocol. The routing protocol includes IS-IS (Intermediate System to Intermediate System) and ES-IS (End System to Intermediate System). "State" indicates the state of connection of the node whose MAC address is set under "System ID". For example, if the node serving as a gateway is normally operating, "Up" is set in the corresponding field of the "State" column. "Interface" indicates the identifier of a communication interface (connection port) from which a packet is delivered to the node identified by "System ID".

In the case of performing OSI routing, the communication control section 110 looks up the OSI level-1 routing table 121*a* to obtain the number of connected destination nodes, and registers the obtained number as the load information 122. Also, the communication control section 110 looks up the OSI level-2 routing table 121*b* to obtain the number of connected areas, and registers the obtained number as the load information 122. In the case of OSI routing, the load information 122 comprises a node count table and an area count table, for example.

FIGS. 5(A) and 5(B) illustrate the load information for OSI routing, wherein FIG. 5(A) shows an OSI node count table and FIG. 5(B) shows an OSI area count table.

The OSI node count table 122*a* has columns "Total", "ADJNUM", "CKTID" and "SYSID". In "ADJNUM", "CKTID" and "SYSID", information about individual destination nodes is set.

"Total" indicates the total number (node count m1; m1 is an integer) of destination nodes connected within an identical area. "ADJNUM" indicates the number of connections (number of transmission routes) up to a corresponding destination node. "CKTID" indicates the port number of a port connected to the corresponding destination node. "SYSID" indicates the MAC address of the corresponding destination node.

The OSI area count table 122*b* has columns "Total", "ADJNUM", "CKTID" and "Area Address". "Total" indicates the total number (area count n1; n1 is an integer) of connected areas. "ADJNUM" indicates the number of connections (number of transmission routes) up to a corresponding area. "CKTID" indicates the port number of a port connected to the corresponding area. "Area Address" indicates the NSAP address of the corresponding area.

The foregoing are examples of tables used for OSI routing. In the following, specific examples of the routing table 121 and load information 122 used in the case of TCP/IP routing will be explained.

Where TCP/IP routing is performed, an ARP table and an IP routing table are prepared as the routing table 121.

FIGS. 6(A) and 6(B) show the TCP/IP routing table by way of example, wherein FIG. 6(A) shows an example of the ARP table and FIG. 6(B) shows an example of the IP routing table.

The ARP table 121c has columns "Internet Address", "Physical Address" and "Type". "Internet Address" indicates the IP address of a corresponding destination node, and "Physical Address" indicates the MAC address of the destination node. "Type" indicates the type of entry, which may be either "static" or "dynamic".

The IP routing table 121d has columns "Destination", "Network mask", "Gateway", "Flags", "Metric" and "Interface". "Destination" indicates the IP address of a corresponding destination node, and "Network mask" indicates a subnet mask of the destination node. By deriving a logical sum of the IP address and the subnet mask, it is possible to obtain a subnet address (area address). "Gateway" indicates the IP address of a node (gateway) which relays a packet transmitted to the destination node. "Flags" indicates the state of routing up to the destination node. "U" indicates that the route concerned is available, "H" indicates a host status, and "G" indicates a gateway status. "Metric" indicates the number of gateways (hop count) present in the route up to the specified gateway. "Interface" indicates the identifier of an interface connected to the destination node.

In the case of performing TCP/IP routing, the communication control section 110 obtains the number of destination nodes from the number of IP addresses registered in the "Destination" column of the IP routing table 121d, and registers the obtained number as the load information 122. Also, the communication control section 110 obtains subnet addresses based on the IP addresses in the "Destination" column of the IP routing table 121d and the corresponding subnet masks in the "Network mask" column, and calculates the number of subnet addresses (identical subnet masks are brought together and counted as one subnet mask). The calculated number of subnet addresses is registered, as the area count, in the load information 122. In the case of TCP/IP routing, the load information 122 comprises a node count table and an area count table, for example.

FIGS. 7(A) and 7(B) illustrate the load information for TCP/IP routing, wherein FIG. 7(A) shows a TCP/IP node count table and FIG. 7(B) shows a TCP/IP area count table.

The TCP/IP node count table 122c has columns "Total", "ADJNUM", "CKTID" and "Physical Address". Information about individual destination nodes is set under "ADJNUM", "CKTID" and "Physical Address".

"Total" indicates the total number (node count m2; m2 is an integer) of destination nodes connected within an identical area. "ADJNUM" indicates the number of connections (number of transmission routes) up to a corresponding destination node. "CKTID" indicates the port number of a port connected to the corresponding destination node. "Physical Address" indicates the MAC address of the corresponding destination node.

The TCP/IP area count table 122d has columns "Total", "ADJNUM", "CKTID" and "IP Address". "Total" indicates the total number (area count n2; n2 is an integer) of connected areas. "ADJNUM" indicates the number of connections (number of transmission routes) up to a corresponding area. "CKTID" indicates the port number of a port connected to the corresponding area. "IP Address" indicates the IP address of the corresponding area.

With the aforementioned routing table 121 and load information 122 stored in the routing information storage section 120, an alarm display process is performed.

Figure 8:
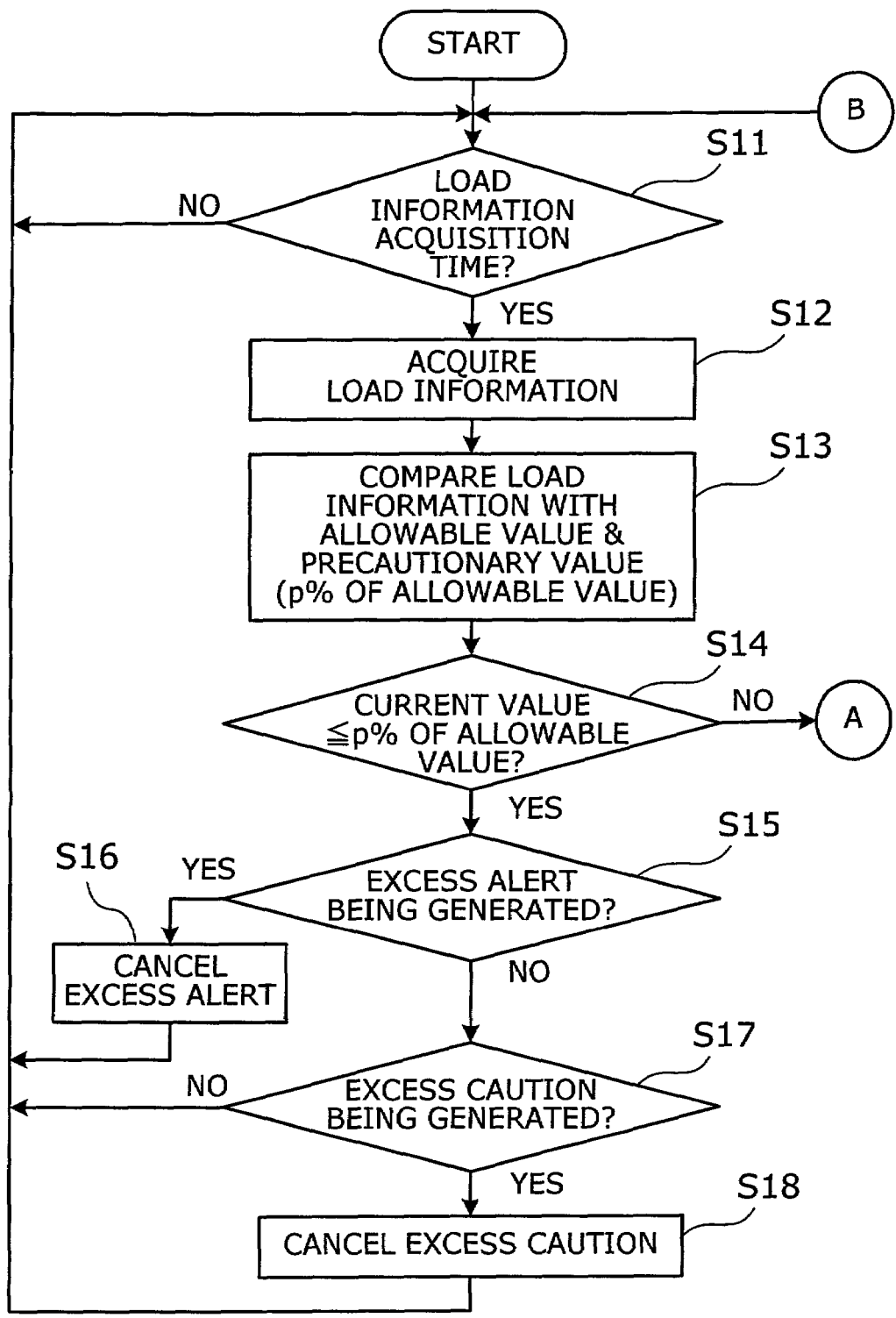
FIG. 8 is a flowchart illustrating the first half of an alarm display procedure.

FIG. 8 is a flowchart illustrating the first half of the alarm display procedure. In the following, the process shown in FIG. 8 will be explained in ascending order of step number. According to the first embodiment, the alarm display process shown in FIG. 8 is performed with respect to both the node count and the area count. Although the following description is directed to the alarm display process for the node count, a similar alarm display process is performed with respect to the area count also (the current value, allowable value and precautionary value of the node count are replaced respectively by the current value, allowable value and precautionary value of the area count).

[Step S11] The monitoring control section 130 determines whether or not the time (load information acquisition time) to acquire the load information has arrived. For example, the monitoring control section 130 has a timer which is reset each time the load information is acquired, and determines whether or not the time measured by the timer has reached a preset time, to thereby determine whether or not the load information acquisition time has arrived. If the load information acquisition time has arrived, the process proceeds to Step S12; if not, Step S11 is repeated.

[Step S12] The monitoring control section 130 acquires a current value of the node count from the load information 122 stored in the routing information storage section 120. Then, the monitoring control section 130 transfers the acquired current value of the node count to the determining section 140.

[Step S13] The determining section 140 compares the current value of the node count with each of the allowable and precautionary values of the node count. It is assumed that the precautionary value is defined as p % of the allowable value.

[Step S14] The determining section 140 determines whether or not the current value of the node count takes a value smaller than or equal to p % (precautionary value) of the allowable value. If the current value of the node count is smaller than or equal to the precautionary value, the comparison result is transferred from the determining section 140 to the alarm processing section 150, and the process proceeds to Step S15. If the current value of the node count is greater than the precautionary value, the process proceeds to Step S21 in FIG. 9.

[Step S15] The alarm processing section 150 ascertains a current state of alarm to determine whether or not an excess alert is being generated. If the excess alert is being generated, the process proceeds to Step S16; if not, the process proceeds to Step S17.

[Step S16] The alarm processing section 150 cancels the excess alert being generated. As a result, an excess alert message displayed until then on the screen of the display device disappears from the screen. The process then proceeds to Step S11.

[Step S17] The alarm processing section 150 ascertains the current state of alarm to determine whether or not an excess caution is being generated. If the excess caution is being generated, the process proceeds to Step S18; if not, the non-alarmed state is maintained and the process proceeds to Step S11.

[Step S18] The alarm processing section 150 cancels the excess caution being generated, and as a result, an excess caution message displayed until then on the screen of the display device disappears from the screen. The process then proceeds to Step S11.

Figure 9:
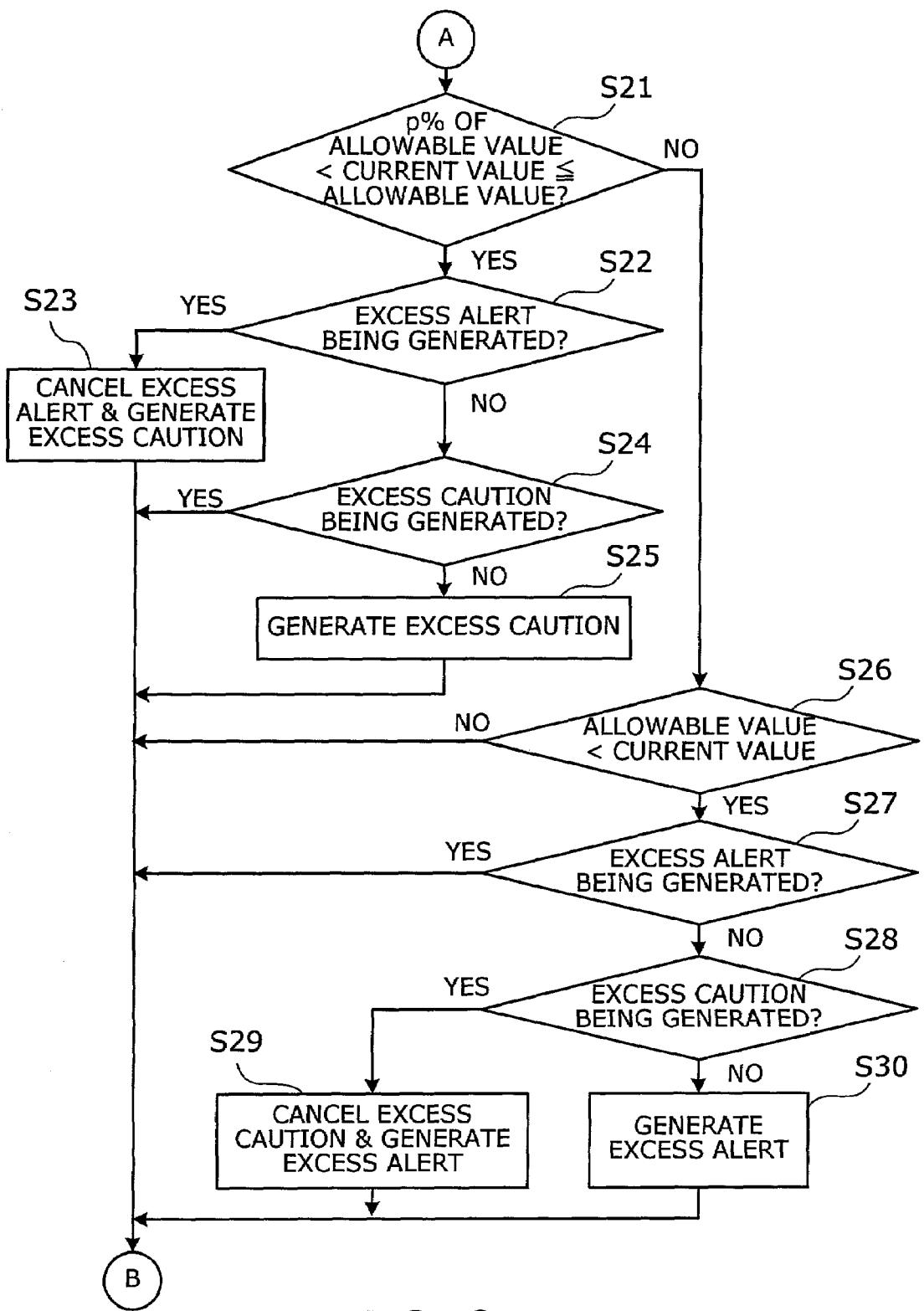
FIG. 9 is a flowchart illustrating the latter half of the alarm display procedure.

FIG. 9 is a flowchart illustrating the latter half of the alarm display procedure. In the following, the alarm display process shown in FIG. 9, which is the process for the node count, will be explained in ascending order of step number.

[Step S21] The determining section 140 determines whether or not the current value of the node count takes a value greater than p % (precautionary value) of the allowable value and at the same time smaller than or equal to the allowable value. If the current value of the node count is greater than the precautionary value and smaller than or equal to the allowable value, the comparison result is transferred from the determining section 140 to the alarm processing section 150 and the process proceeds to Step S22; if not, the process proceeds to Step S26.

[Step S22] The alarm processing section 150 ascertains the current state of alarm to determine whether or not the excess alert is being generated. If the excess alert is being generated, the process proceeds to Step S23; if not, the process proceeds to Step S24.

[Step S23] The alarm processing section 150 cancels the excess alert being generated and generates the excess caution instead. As a consequence, the excess alert message displayed until then on the screen of the display device disappears from the screen, and an excess caution message is displayed instead. Then, the process proceeds to Step S11 in FIG. 8.

[Step S24] The alarm processing section 150 ascertains the current state of alarm to determine whether or not the excess caution is being generated. If the excess caution is being generated, the excess caution-generated state is maintained and the process proceeds to Step S11 in FIG. 8; if not, the process proceeds to Step S25.

[Step S25] The alarm processing section 150 generates the excess caution, and as a result, an excess caution message is displayed on the screen of the display device. The process then proceeds to Step S11 in FIG. 8.

[Step S26] The determining section 140 determines whether or not the current value of the node count is greater than the allowable value. If the current value of the node count is greater than the allowable value, the comparison result is transferred from the determining section 140 to the alarm processing section 150, and the process proceeds to Step S27. If the current value of the node count is smaller than or equal to the allowable value, the process proceeds to Step S11 in FIG. 8.

In FIG. 9, Step S26 is provided in order to clarify the determination process performed by the determining section 140; namely, where the process has proceeded to Step S26 via Steps S14 and S21, the current value of the node count is inevitably greater than the allowable value. Accordingly, the determination in Step S26 never results in NO.

[Step S27] The alarm processing section 150 ascertains the current state of alarm to determine whether or not the excess alert is being generated. If the excess alert is being generated, the excess alert-generated state is maintained and the process proceeds to Step S11 in FIG. 8; if not, the process proceeds to Step S28.

[Step S28] The alarm processing section 150 ascertains the current state of alarm to determine whether or not the excess caution is being generated. If the excess caution is being generated, the process proceeds to Step S29; if not, the process proceeds to Step S30.

[Step S29] The alarm processing section 150 cancels the excess caution being generated and generates the excess alert instead. As a result, the excess caution message displayed until then on the screen of the display device disappears form the screen and an excess alert message is displayed instead. The process then proceeds to Step S11 in FIG. 8.

[Step S30] The alarm processing section 150 generates the excess alert, and consequently, an excess alert message is displayed on the screen of the display device. The process then proceeds to Step S11 in FIG. 8.

In this manner, the node count set in the load information 122 is monitored, and if the node count becomes greater than a predetermined number, the excess caution or excess alert is generated. On generation of such an alarm, a message signifying the alarm is displayed on the screen of the display device, so that the user is notified of the alarm. Similarly, also when the area count has exceeded a predetermined number, the excess caution or excess alert is generated and a corresponding message is displayed.

As described above, the node which performs routing itself monitors the routing load, and when the load has become excessively large, an alarm is output. Accordingly, the operator need not calculate the loads on all nodes each time the network is extended, and thus is saved the labor and time required for the network management.

In the above example, the node count is calculated based on dynamically created routing information, but static routing information also is a subject of node counting. Such static routing information is set in the routing table 121 by the user interface processing section 160 in accordance with the user's input operation, for example.

Also, in the above example, the monitoring control section 130 acquires the load information 122 by w polling. Alternatively, each time the communication control section 110 updates the load information 122, the load information 122 may be transferred from the communication control section 110 to the monitoring control section 130.

After confirming the alarm message, the user can display the node and area counts stored as the load information 122 on screen by operating the node 100. In this case, in response to the user's input operation, the user interface processing section 160 sends a read request to the monitoring control section 130 to read out the load information 122. On receiving the request to read out the load information 122, the monitoring control section 130 reads out the load information 122 from the routing information storage section 120, and transfers the node and area counts to the user interface processing section 160. The user interface processing section 160 displays the node and area counts received from the monitoring control section 130 on the screen of the display device, whereby the user can ascertain the node and area counts.

SECOND EMBODIMENT

The second embodiment will be now described. In the second embodiment, the allowable values and the precautionary values can be set by the user's input operation.

Figure 10:
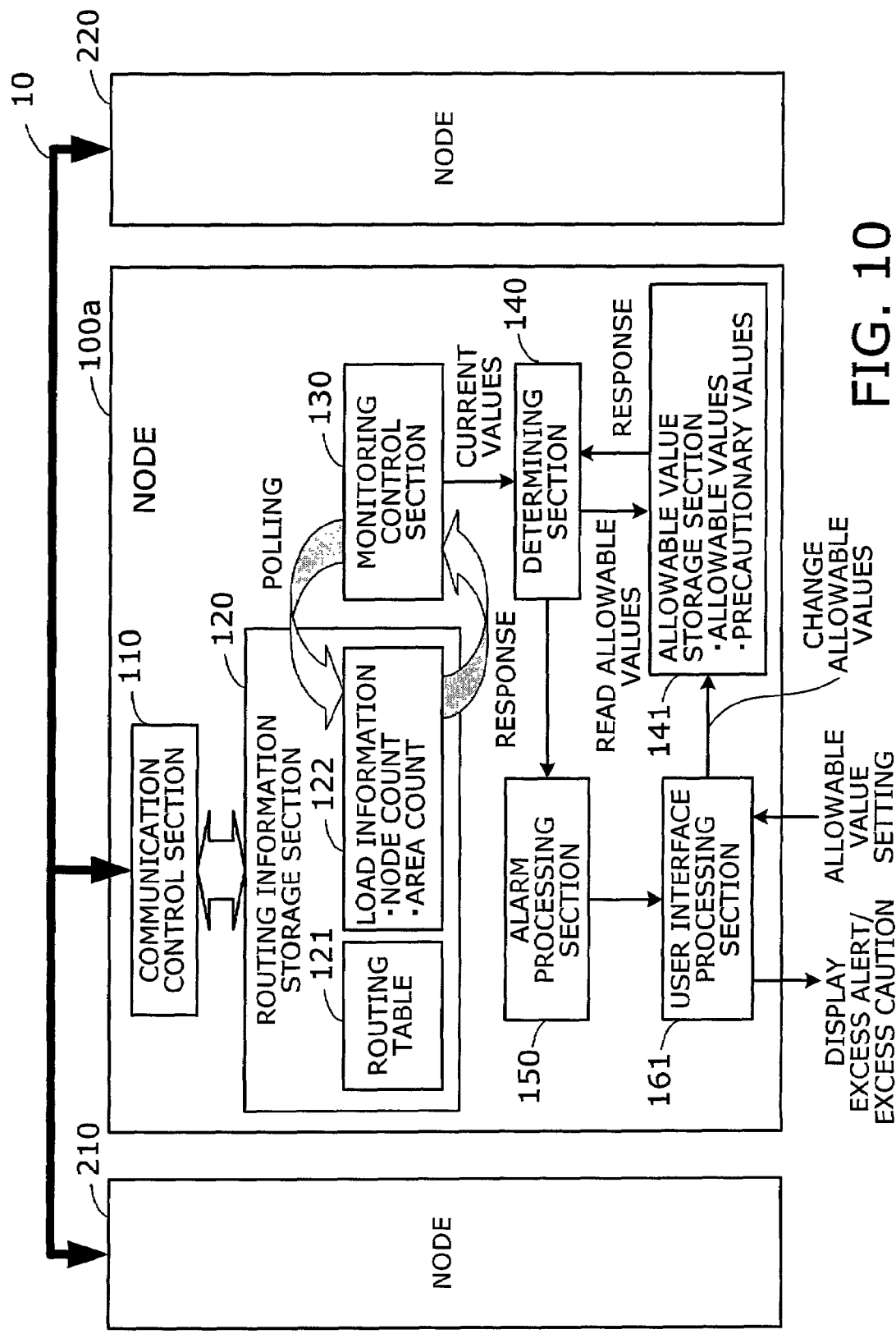
FIG. 10 is a functional block diagram illustrating the function of a network device according to a second embodiment.

FIG. 10 is a functional block diagram illustrating the function of a network device according to the second embodiment. The configuration of the second embodiment is almost identical with that of the first embodiment; therefore, in FIG. 10, identical reference numerals are used to denote elements with the same functions as those in the first embodiment shown in FIG. 3, and description of such elements is omitted.

A node 100a according to the second embodiment differs from the node of the first embodiment only in the function of a user interface processing section 161. The user interface processing section 161 has, in addition to the function of the user interface processing section 160 of the first embodiment, a function whereby information can be set in the allowable value storage section 141 in response to the user's input operation. Specifically, the user operates an input device such as the keyboard 12 to enter an allowable value or precautionary value (rate with respect to the allowable value), whereupon the user interface processing section 161 updates the allowable value or precautionary value in the allowable value storage section 141 in accordance with the input value. After the allowable value or precautionary value in the allowable value storage section 141 is updated, the determining section 140 makes a determination as to the need for alarm based on the updated value.

Thus, the user is allowed to set the allowable value or precautionary value for the node count as well as the allowable value or precautionary value for the area count as needed. Consequently, in cases where the function of the node 100a is enhanced (e.g., a RAM or communication interface is added) and thus the throughput has improved, for example, the allowable values and the precautionary values can be easily set to values matching the improved throughput. Also, even in cases where the allowable values differ depending on the type (OSI or TCP/IP) of the network 10 to which the node 100a is connected, the allowable values and the precautionary values can be varied appropriately in compliance with the type of the network 10.

THIRD EMBODIMENT

The third embodiment will be now described. In the third embodiment, the user is periodically notified of the numbers of connected nodes and areas.

Figure 11:
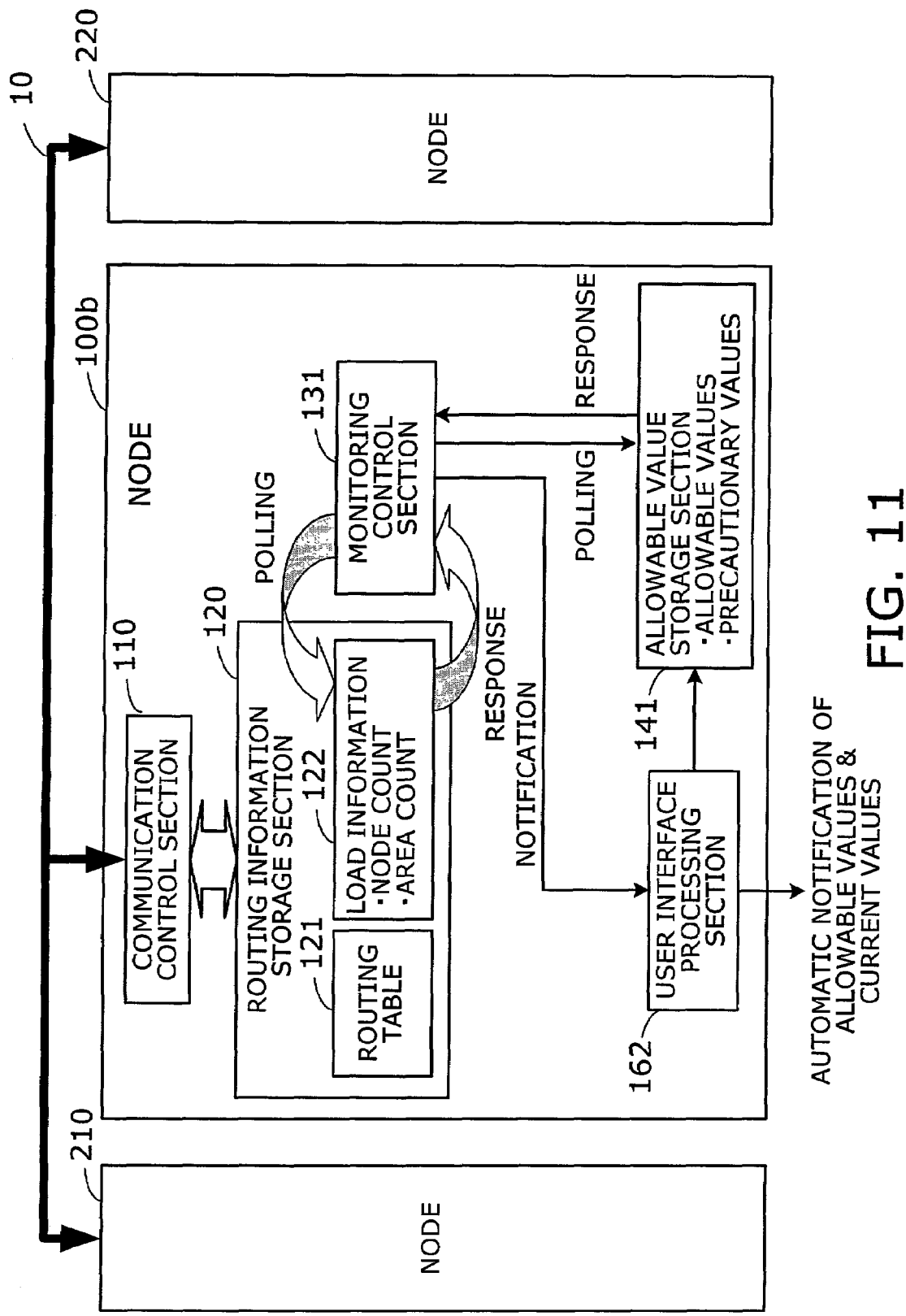
FIG. 11 is a functional block diagram illustrating the function of a network device according to a third embodiment.

FIG. 11 is a functional block diagram illustrating the function of a network device according to the third embodiment. The configuration of the third embodiment is almost identical with that of the first embodiment; therefore, in FIG. 11, identical reference numerals are used to denote elements with the same functions as those in the first embodiment shown in FIG. 3, and description of such elements is omitted.

A node 100b according to the third embodiment differs from the node of the first embodiment in the functions of a monitoring control section 131 and user interface processing section 162. In FIG. 11, the determining section 140 and the alarm processing section 150 (cf. FIG. 3) provided in the first embodiment are omitted.

The monitoring control section 131 periodically polls the routing information storage section 120 and acquires, as a response to the polling, current values of the load information 122 (node count and area count) Similarly, the monitoring control section 131 periodically polls the allowable value storage section 141 and acquires, as a response to the polling, the allowable values for the node and area counts from the allowable value storage section 141. Time intervals (monitoring period) at which the information is acquired are set in the monitoring control section 131 beforehand. The monitoring control section 131 notifies the user interface processing section 162 of the acquired current and allowable values of the node and area counts.

The user interface processing section 162 displays the current and allowable values of the node and area counts, notified from the monitoring control section 131, on the screen of the display device. For example, the user interface processing section 162 causes the display device to always display a performance monitor screen showing the current and allowable values of the node and area counts. The values shown on the screen are updated each time the information is supplied from the monitoring control section 131.

With the node 100b described above, each time the routing table 121 is updated, the node and area counts of the load information 122 are updated. The load information 122 is periodically collected by the monitoring control section 131 and transferred to the user interface processing section 162. At this time, the allowable values are also collected by the monitoring control section 131 and transferred to the user interface processing section 162. Consequently, an automatic notification screen showing the current and allowable values of the node and area counts is displayed by the user interface processing section 162.

Figure 12:
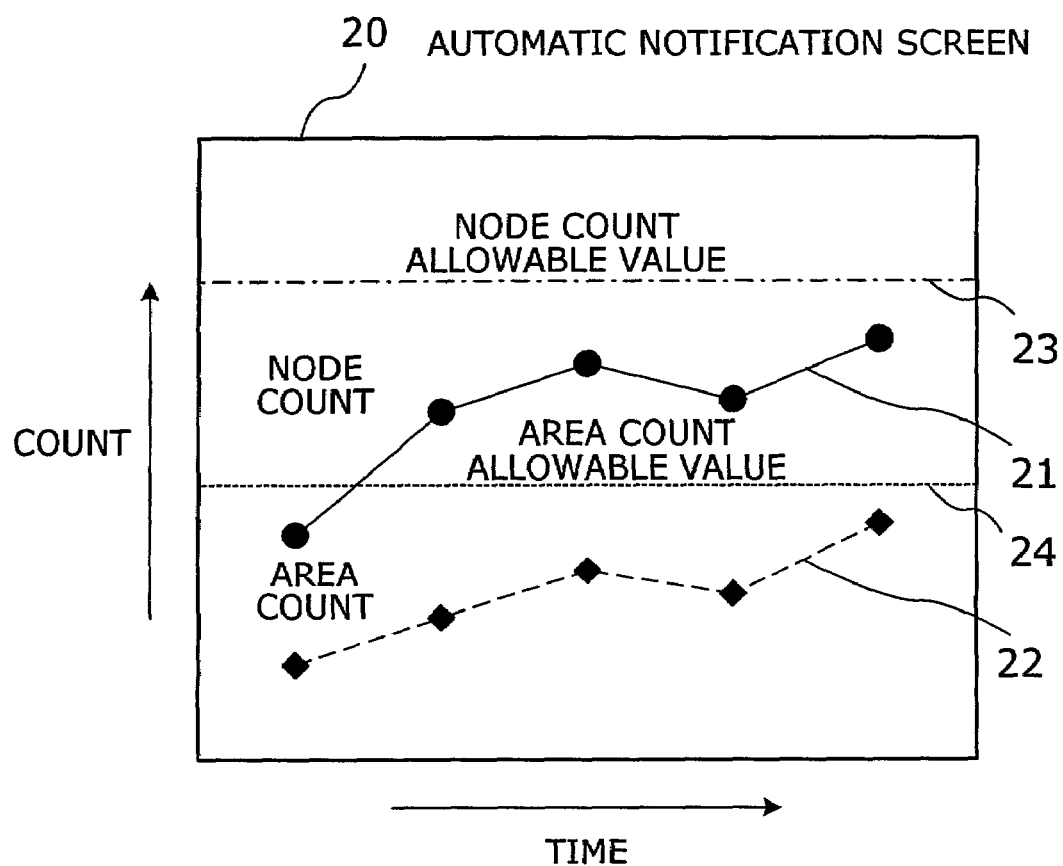
FIG. 12 is a diagram showing an example of an automatic notification screen indicating a node count and an area count.

FIG. 12 shows an example of the automatic notification screen showing the node and area counts. In the automatic notification screen 20, the horizontal axis indicates time and the vertical axis indicates count. Each time the node and area counts are notified, these counts are displayed as dark spots (round spot for the node count and square spot for the area count) at respective coordinates at a corresponding time in the automatic notification screen 20. A change in the node count with time is indicated by a bent line 21, and a change in the area count with time is indicated by a bent line 22. Also, in the automatic notification screen 20, the allowable value for the node count is indicated by a dot-dash line 23, and the allowable value for the area count is indicated by a dotted line 24.

Thus, since the automatic notification screen showing the current values of the node and area counts is displayed, the user who administers the node 100b can ascertain the latest values of the node and area counts at any time to see if the node and area counts have reached their respective allowable values, without the need for any particular input operation or the like.

FOURTH EMBODIMENT

The fourth embodiment will be now described. In the fourth embodiment, notification/non-notification of the excess alert and excess caution for the node and area counts can be set as desired.

Figure 13:
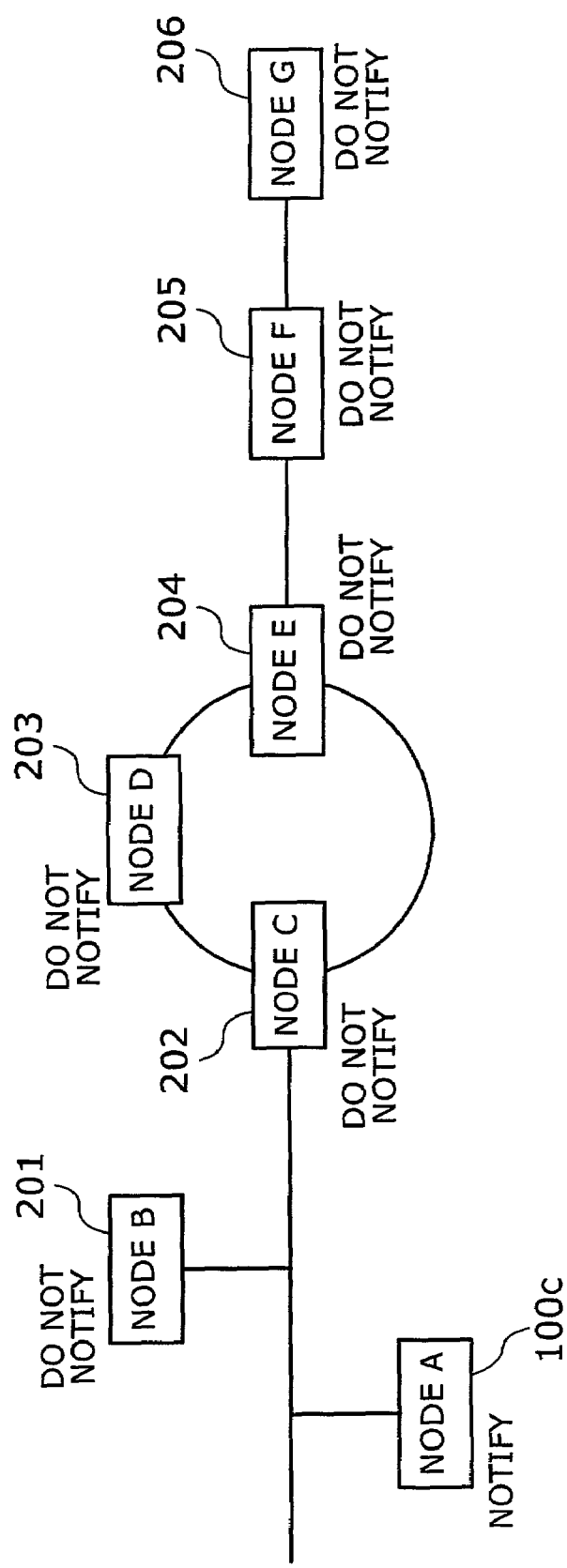
FIG. 13 is a diagram illustrating an exemplary system configuration according to a fourth embodiment.

FIG. 13 shows an example of a system configuration according to the fourth embodiment. In the example shown in FIG. 13, nodes 100c and 201 to 206 are connected to a network. The nodes 100c and 201 to 206 have names "node A", "node B", "node C", "node D", "node E", "node F" and "node G", respectively.

In this system, the nodes 100c and 201 to 206 each perform routing and thus can identify the numbers of nodes and areas connected within the network. Accordingly, the user who administers the network may wish to have a routing load-related alarm, such as the excess alert, generated from at least one (e.g., node 100c) of the network devices. In the fourth embodiment, therefore, the user is allowed to make settings as desired as to whether or not the alarm needs to be generated from each of the nodes 100c and 201 to 206.

Figure 14:
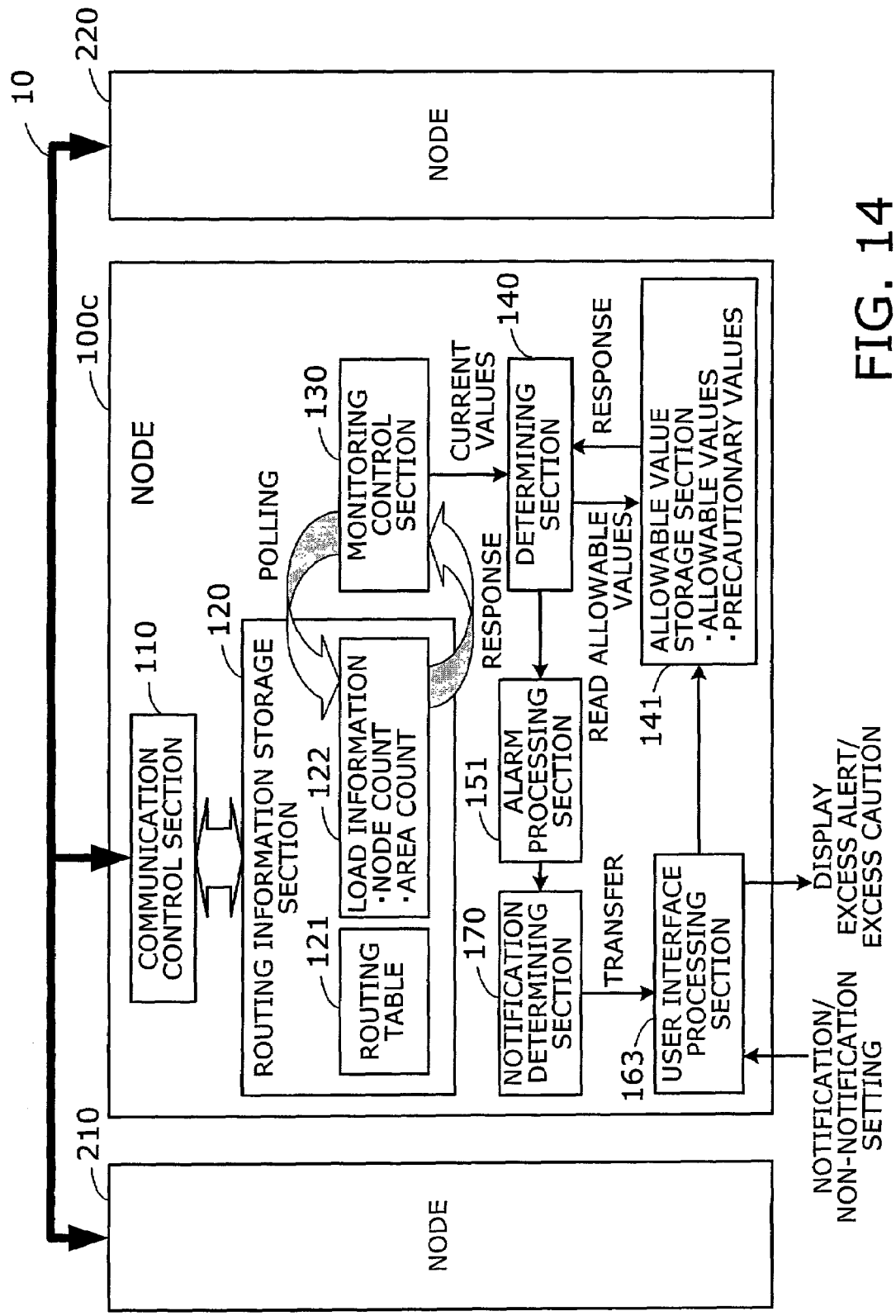
FIG. 14 is a functional block diagram illustrating the function of a network device according to the fourth embodiment.

FIG. 14 is a functional block diagram illustrating the function of the network device according to the fourth embodiment. The configuration of the fourth embodiment is almost identical with that of the first embodiment; therefore, in FIG. 14, identical reference numerals are used to denote elements with the same functions as those of the first embodiment shown in FIG. 3, and description of such elements is omitted.

In the fourth embodiment, an alarm processing section 151 and a user interface processing section 163 differ in processing function from the counterparts of the first embodiment, and also a notification determining section 170 is additionally provided.

The alarm processing section 151 has a function similar to that of the alarm processing section 150 (cf. FIG. 3) of the first embodiment, but transfers an excess alert or excess caution message to the notification determining section 170, and not to the user interface processing section 163.

The user interface processing section 163 has a function similar to that of the user interface processing section 160 (cf. FIG. 3) of the first embodiment, but receives an excess alert or excess caution message from the notification determining section 170, and not from the alarm processing section 151. Also, in response to the user's input operation, the user interface processing section 163 enters an alarm notification/non-notification setting into the notification determining section 170.

The notification determining section 170 receives the notification or non-notification setting from the user interface processing section 163 and holds its contents therein. Also, on receiving an excess alert or excess caution message from the alarm processing section 151, the notification determining section 170 ascertains the notification/non-notification setting to determine whether or not the message needs to be notified. If the notification setting has been received from the user interface processing section 163 (notification needed), the notification determining section 170 transfers the message received from the alarm processing section 151 to the user interface processing section 163. On the other hand, if the non-notification setting has been received from the user interface processing section 163 (notification unneeded), the notification determining section 170 discards the message received from the alarm processing section 151.

With the node 100c described above, if the processing load on the network 10 increases to an extent such that the node count in the node 100c exceeds the allowable value and thus the alarm processing section 151 outputs an alarm message, the notification determining section 170 determines whether or not the message needs to be notified. Only when the message notification setting has been entered by the user through the user interface processing section 163, an excess alert or excess caution message generated by the alarm processing section 151 is displayed at the display device.

This permits an alarm message to be displayed only at a node which the user has specified as desired from among the nodes 100c and 201 to 206 constituting the network 10, and also the processing load of the overall network can be lightened. For example, the notification setting is entered into one or more network devices within an area such as a gateway or gateways, while the non-notification setting is entered into the other network devices. This makes it possible to give the user an alert or caution indicating excess of the node or area count, with a minimum load imposed on the network 10 as a whole.

FIFTH EMBODIMENT

The fifth embodiment will be now described. In the fifth embodiment, the load on a network is monitored by using a network device (node) provided exclusively for network monitoring. In the following, the network monitoring node is referred to specially as monitoring control device.

Figure 15:
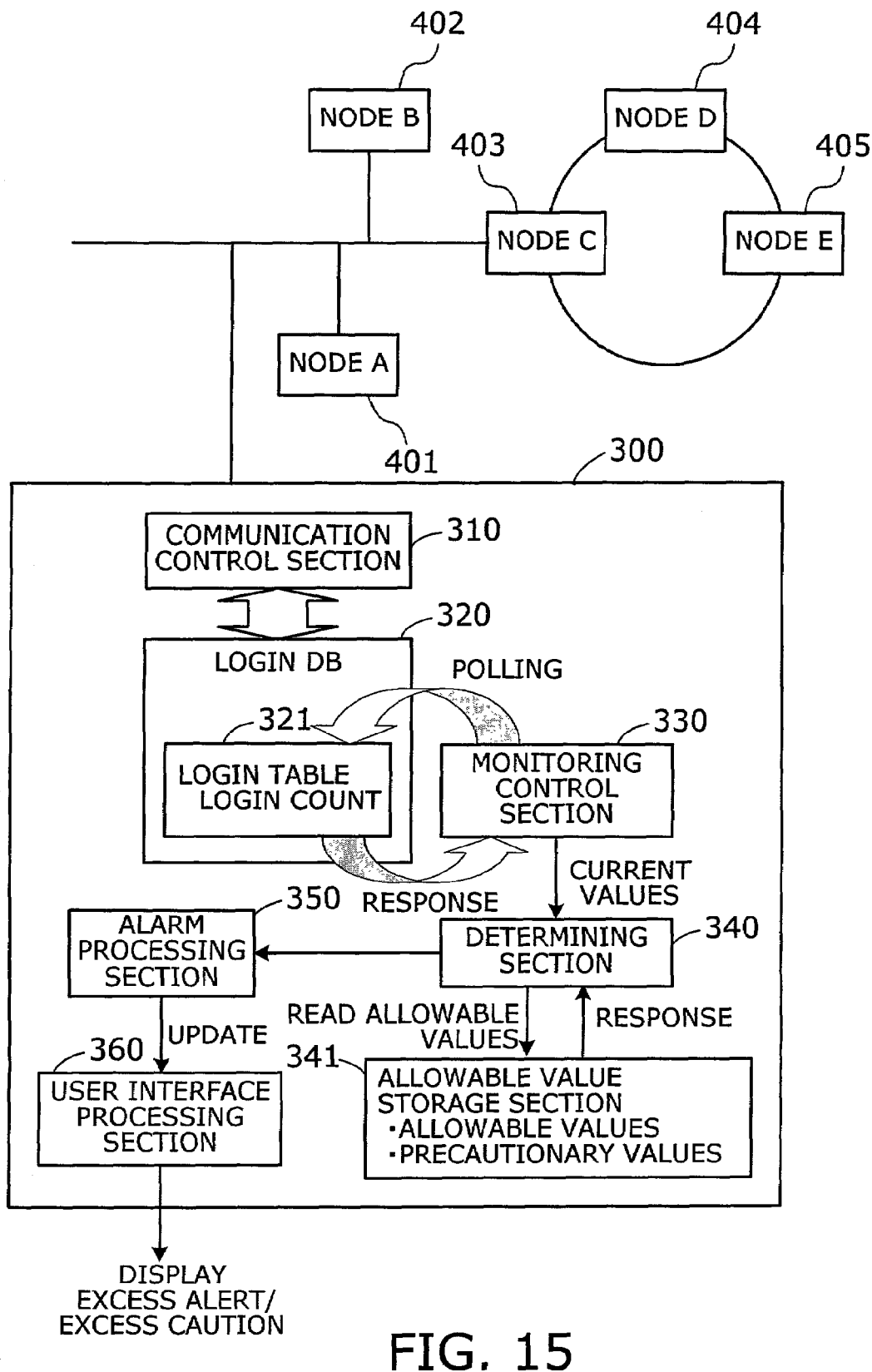
FIG. 15 is a diagram illustrating a system configuration according to a fifth embodiment.
Figure 17:
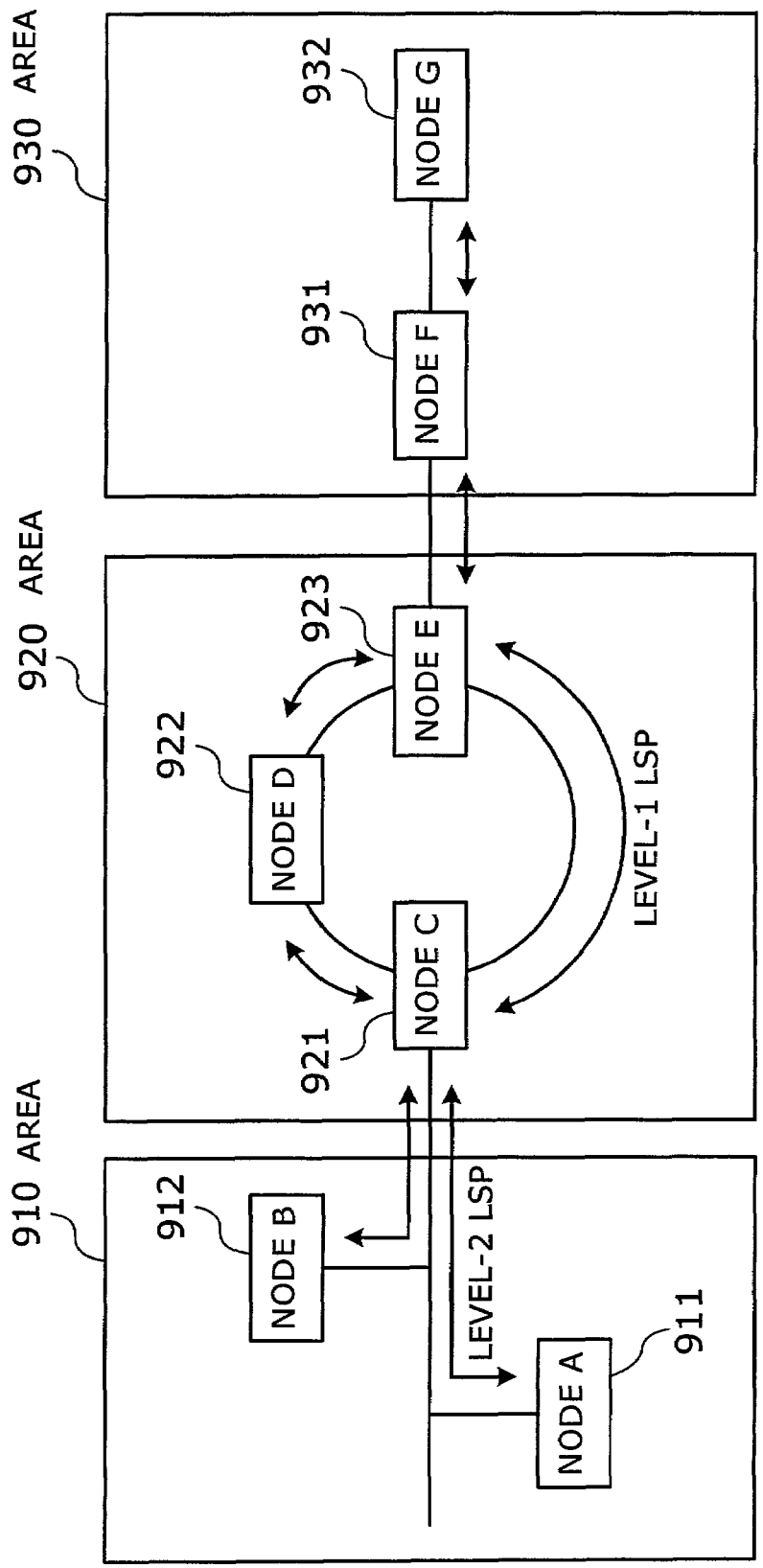
FIG. 17 is a diagram showing an example of a conventional network configuration.

FIG. 15 shows a system configuration according to the fifth embodiment. In the fifth embodiment, a network is constituted by a monitoring control device 300 and other nodes 401 to 405. The nodes 401 to 405 have names "node A", "node B", "node C", "node D" and "node E", respectively.

The monitoring control device 300 includes a communication control section 310, a login database (DB) 320, a monitoring control section 330, a determining section 340, an allowable value storage section 341, an alarm processing section 350, and a user interface processing section 360.

The communication control section 310 communicates via the network and performs a remote login onto the other operated nodes 401 to 405. Account information (node addresses, user names, passwords, etc.) necessary for remote logins is stored in the login DB 320. The communication control section 310 also counts the number of logged-in nodes and stores the count in the login DB 320.

The login DB 320 stores a login table 321. In the login table 321 are set information necessary for logging in onto the other nodes 401 to 405 and the login count.

The monitoring control section 330 periodically polls the login DB 320 and acquires, as a response to the polling, a current value of the login count from the login DB 320. Then, the monitoring control section 330 transfers the acquired current value of the login count to the determining section 340.

The determining section 340 looks up allowable and precautionary values stored in the allowable value storage section 341 to determine whether or not an alarm needs to be generated. Specifically, allowable and precautionary values for the login count are stored beforehand in the allowable value storage section 341. The allowable value for the login count is set to a maximum number of nodes up to which routing can be performed with ease throughout the network. The determining section 340 notifies the alarm processing section 350 of the determination result.

The alarm processing section 350 transfers an alarm message (excess alert or excess caution) matching the determination result received from the determining section 340 to the user interface processing section 360.

The user interface processing section 360 displays the message transferred from the alarm processing section 350, such as the excess alert, on the screen of the display device.

FIG. 16 shows an example of the login table. The login table 321 has columns "Total", "SYSID", "AREAADDR/IP address", "Gateway", "User", "Level", "Password", "State" and "Interface".

"Total" indicates the total number (login count m3; m3 is an integer) of logins. "SYSID" indicates the MAC address of a corresponding node to be logged in. "AREAADDR/IP address" indicates the area address of the node to be logged in or the address (NSAP address, IP address) of the node itself. "Gateway" indicates the address of a relay node (gateway), and "User" indicates the name of a user with an account registered in the node to be logged in. "Level" indicates a login level of the user with the account registered in the node to be logged in, and "Password" indicates the password for the account registered in the node to be logged in. "State" indicates the state of connection, and when the corresponding node is logged in, "Up" is set as "State". "Interface" indicates the identifier of a communication interface (connection port) for connecting to the node to be logged in.

With the aforementioned monitoring control device 300, the communication control section 310 tries to log in onto all of the nodes set in the login table 321. When logging in onto another node on the network, the communication control section 310 transmits a packet requesting a login to the node. If the node to be logged in is operated, the login meets with success and the node returns a packet indicating that the login has been accepted. By determining whether or not the login-accepting packet is returned from the node to be logged in, the communication control section 310 can determine whether the login succeeded or not.

The communication control section 310 then sets "Up" in the field of the column "State" corresponding to the normally logged-in node, and counts the number of normally logged-in nodes. The result of counting is set in the "Total" column as the total number (login count) of logged-in nodes. The communication control section 310 tries a login at predetermined intervals with respect to those nodes which could not be normally logged in.

Also, the communication control section 310 periodically transmits a monitoring control packet to those nodes which could be logged in, to ascertain their login state. If the login state changes, the login count is recalculated, so that the value in the "Total" column of the login table 321 varies dynamically.

The login count set in the "Total" column of the login table 321 is monitored by the monitoring control section 330, which periodically polls the login table to acquire a current value of the login count. The current value of the login count is transferred from the monitoring control section 330 to the determining section 340, whereupon the determining section 340 compares the current value of the login count with each of the allowable and precautionary values. The comparison results are supplied to the alarm processing section 350.

If, as a result of comparison, it is judged that the current value of the login count is smaller than or equal to the precautionary value, the alarm processing section 350 generates no alarm message (cancels the then-generated message, if any). If the results of comparison show that the current value of the login count is greater than the precautionary value and at the same time smaller than or equal to the allowable value, the alarm processing section 350 generates an excess caution message (the excess alert message is canceled if the excess alert has been generated until then). If, as a result of comparison, it is judged that the current value of the login count is greater than the allowable value, the alarm processing section 350 generates an excess alert message (the excess caution message is canceled if the excess caution has been generated until then).

The message generated by the alarm processing section 350 is transferred to the user interface processing section 360, whereupon the message is displayed on the screen of the display device by the user interface processing section 360.

In this manner, the number of nodes connected to the network can be managed in terms of the number of logins onto nodes connected to the network. As a consequence, the load on the network can be monitored without the need to use the routing function, and when the load has exceeded the allowable value, an excess alert can be generated. Routing information is not exchanged, and therefore, the loaded state of the network can be ascertained without imposing load on the nodes or the network.

The login count stored in the login DB 320 may be the number of logins of the entire network, or the number of logins of each area (each subnet in the case of TCP/IP), or the number of logins of each form of connection (OSI-LAN (Local Area Network), OSI-DCC (Direct Cable Connection), TCP/IP-LAN, X.25, etc.).

Further, the processing function described above can be implemented by a server computer of a client-server system. In this case, a server program is provided in which are described processes for performing the functions of the network monitoring device, router, and monitoring control device. The server computer executes the server program in compliance with a request from a client computer, whereby the aforementioned processing function is performed by the server computer and the processing results are presented to the client computer.

The server program describing the processes may be recorded on a server computer-readable recording medium. The server computer-readable recording medium includes magnetic recording device, optical disk, magneto-optical recording medium, semiconductor memory, etc. Such a magnetic recording device may be hard disk drive (HDD), flexible disk (FD), magnetic tape, etc. As the optical disk, DVD (Digital Versatile Disc), DVD-RAM (Random Access Memory), CD-ROM (Compact Disc Read Only Memory), CD-R (Recordable)/RW (ReWritable) or the like may be used. The magneto-optical recording medium includes MO (Magneto-Optical disc) etc.

To distribute the server program, portable recording media, such as DVD and CD-ROM, on which the server program is recorded may be put on sale.

The server program recorded on a portable recording medium, for example, is stored in the storage device of the server computer which is to execute the server program. The server computer reads in the server program from its storage device and performs processes in accordance with the server program. Alternatively, the server computer may read in the server program directly from the portable recording medium to perform processes in accordance with the server program.

As described above, according to the present invention, the number of nodes operated on a network is counted, and when the node count has exceeded an allowable value, a message that the allowable value is exceeded is output. It is therefore unnecessary for the user to examine each router to determine whether or not the number of nodes connected to the network has exceeded a number up to which routing can be performed normally. Consequently, the user is saved the work load accompanying reconfiguration of the network and also the network operation reliability improves.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network monitoring device for monitoring load on a network, comprising:

communication control means for communicating with a plurality of destination nodes via the network and performing at least one of a first routing, a second routing and a third routing, the first routing being an intra-area OSI routing, the second routing being an inter-area OSI routing and the third routing being TCP/IP routing;

a first routing table for registering one or wore first MAC addresses of corresponding first one or more of the plurality of destination nodes when the first routing is performed;

a second routing table for registering one or more second MAC addresses of corresponding second one or more of the plurality of destination nodes that serve as a gateway for a packet transmitted to a corresponding area address when the second routing is performed;

a third routing table for registering one or more IP addresses of the second one or more of the plurality of destination nodes when the second routing is performed;

counting means for counting a number of first destination nodes from a number of the first MAC addresses registered in the first routing table, counting a number of second destination nodes from a number of the second MAC addresses registered in the second routing table, and counting a number of third destination nodes from a number of the IP addresses registered in the third routing table;

comparing means for comparing the first destination node count obtained from the first routing table with a preset first allowable value, and comparing the second destination node count obtained from the second routing table with a preset second allowable value, and comparing the third destination node count obtained from the third routing table with a preset third allowable value;

alarm output means for outputting a first alarm that the first node count is excessively large when said comparing means determines that the first node count has exceeded the first allowable value, and outputting a second alarm that the second node count is excessively large when said comparing means determines that the second node count has exceeded the second allowable value, and outputting a third alarm that the third node count is excessively large when said comparing means determines that the third node count has exceeded the third allowable value.

2. The network monitoring device according to claim 1, further comprising setting means for setting the first allowable value, the second allowable value and the third allowable value in response to a user's input operation.

3. The network monitoring device according to claim 1, wherein said comparing means compares the first node count counted by said counting means with a preset first precautionary value smaller than the first allowable value, said alarm output means outputs a first message that caution is needed against excess of the first node count when said comparing means determines that the first node count has exceeded the first precautionary value, said comparing means compares the second node count counted by said counting means with a preset second precautionary value smaller than the second allowable value, said alarm output means outputs a second message that caution is needed against excess of the second node count when said comparing means determines that the second node count has exceeded the second precautionary value, said comparing means compares the third node count counted by said counting means with a preset third precautionary value smaller than the third allowable value, and said alarm output means outputs a third message that caution is needed against excess of the third node count when said comparing means determines that the third node count has exceeded the third precautionary value.

4. The network monitoring device according to claim 1, further comprising monitoring means for periodically acquiring at least one of the first node count, the second node count and the third node count counted by said counting means; and display means for displaying change with time of each of the first node count, the second node count and the third node count acquired by said monitoring means.

5. The network monitoring device according to claim 1, further comprising determining means for determining, in accordance with a user's input operation, whether the first alarm, the second alarm and the third alarm output from said alarm output means need to be displayed or not.

* * * * *